Aug. 29, 1933.   F. CHARAVAY   1,924,349
ADJUSTABLE PITCH PROPELLER
Filed March 18, 1931

INVENTOR
FREDERICK CHARAVAY.
BY
ATTORNEYS

Patented Aug. 29, 1933

1,924,349

UNITED STATES PATENT OFFICE 1,924,349

ADJUSTABLE PITCH PROPELLER

Frederick Charavay, Piqua, Ohio, assignor of one-half to Hartzell Industries, Inc., Piqua, Ohio, a corporation of Ohio Application March 18, 1931. Serial No. 523,427

8 Claims. (Cl. 170—173)

My invention relates to improvements in propeller blades and has for its object to provide a propeller blade support to which the blades may be removably attached.

It is also an object of this invention to provide, in connection with a hub, means for supporting a plurality of blades on the hub so that they may be adjusted at various angles with relation to the axis of the hub.

It is also an object of this invention to provide, in connection with a hub, a plurality of integrally threaded split collars for supporting blades on the hub, each half of each collar being connected to another half of a collar by means of a web.

These and other advantages will appear from the following description taken in connection with the drawing.

Referring to the drawing.

Figure 1:
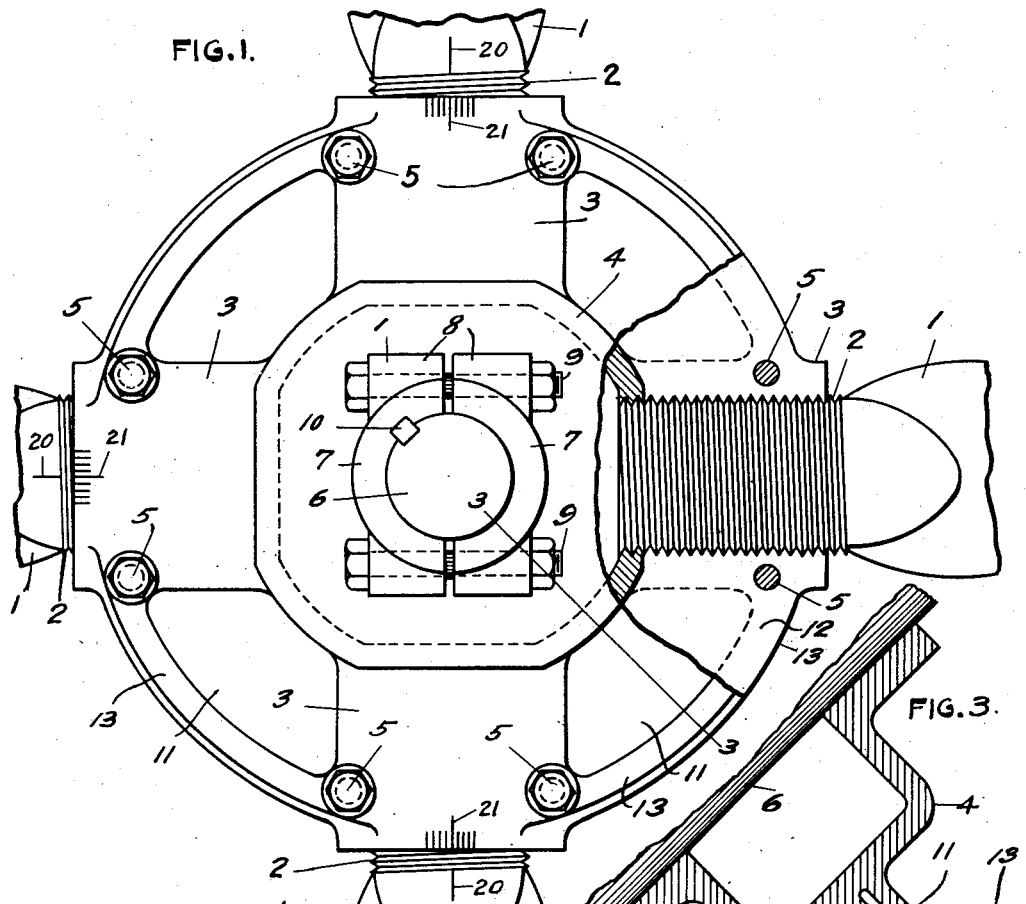
Figure 1 is a detail front elevation of the propeller blade supports and hub mounted on the motor shaft.
Figure 3:
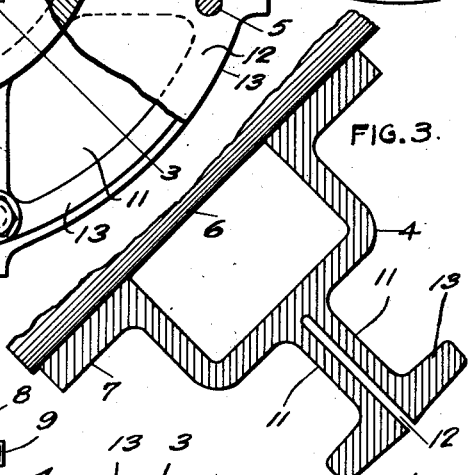
Figure 3 is a section on the line 3—3 of Figure 1.
Figure 2:
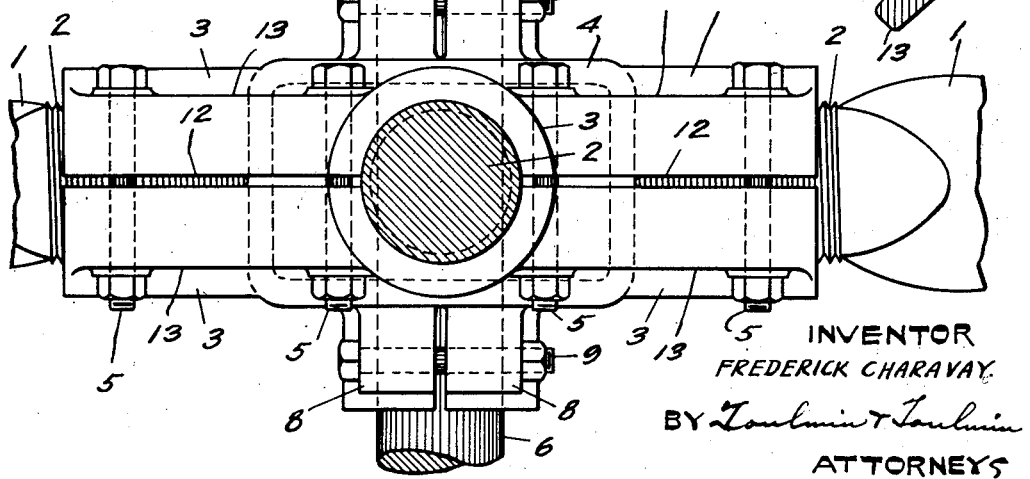
Figure 2 is a side elevation partially in section.

For the purpose of carrying out my invention I have provided the construction shown in detail in Figures 1, 2, and 3. The propeller blade 1 is provided with a threaded shank 2 which is threaded within a split collar 3 formed in the propeller hub 4. This split collar is arranged to clamp the threaded shank 2 through the agency of the clamping bolts 5. Thus the loosening of these bolts permits rotation of the blade 1 to any desired angularity. The degree of such rotation can be indicated in any manner such as by a scale indicator as at 20 and 21.

The hub 4 is mounted upon the motor driving shaft 6 by a split sleeve 7, each half of which has ears 8 on which are mounted the clamping bolts 9. One of these halves of the sleeves 7 is provided with a key 10 which is also mounted on the shaft 6 to cause the hub to rotate with the shaft 6. Thus by loosening the bolts 9, it is possible to remove or adjust laterally the entire propeller structure with respect to the screens for the tips and the motor.

The supporting sleeves 3 mounted on the hub 4 are provided for the purpose of strength, while at the same time securing lightness, with interconnecting webs consisting of the pair of spaced plates 11 separated by a slot 12 and provided with annular flanges 13. These spaced plates 11 are integrally cast on the box-like hub structure 4. It is thus possible by having the reinforcing webs 11 movable with respect to one another to accommodate the clamping and unclamping of the sleeves 3, of which they are a continuation. In other words, the upper half of the sleeve 3 is a continuation of the upper plate members 11 and 13 and the lower half of the sleeve 3 is a continuation of the lower plate members 11 and 13. I thus secure flexibility of connection and of adjustment without disturbing the rigidity of connection between the shanks of the propeller blades and the corresponding structural strength of the hub.

I desire to comprehend within my invention such modifications as may be embraced within my claims and the scope of my invention.

Having thus fully described my invention, what I claim as new and desire to secure by Letters Patent, is:

1. In a means of supporting a propeller blade, a one-piece hub comprising a driving shaft supporting portion and an integrally threaded split collar portion, a propeller blade having a threaded shank threaded within said split collar portion, and means for clamping said collar thereon.

2. In combination in a hub for supporting adjustably a plurality of propeller blades, means of mounting said hub on a driving shaft, a plurality of radially disposed integral threaded split collars mounted on said hub, means of clamping said split collars on the shanks of propeller blades, and interconnecting spaced webs connected to respective halves of said collars and extending therebetween in spaced parallel relationship, the bases of said webs being integrally supported on said hub.

3. In combination in a hub for supporting adjustably a plurality of propeller blades, means of mounting said hub on a driving shaft, a plurality of radially disposed integral threaded split collars mounted on said hub, means of clamping said split collars on the shanks of propeller blades, and interconnecting spaced webs connected to respective halves of said collars and extending therebetween in spaced parallel relationship, the bases of said webs being integrally supported on said hub, said split collars for supporting said propeller blade shanks being integrally threaded to receive correspondingly threaded propeller blade shanks.

4. In combination in a hub for supporting adjustably a plurality of propeller blades, means of mounting said hub on a driving shaft, a plurality of radially disposed integral threaded split collars mounted on said hub, means of clamping said split collars on the shanks of propeller blades, and interconnecting spaced webs connected to respective halves of said collars and extending therebetween in spaced parallel relationship, the bases of said webs being integrally supported on said hub, said split collars for supporting said propeller blade shanks being integrally threaded to receive correspondingly threaded propeller blade shanks, and an annular reinforcing rib mounted on each of said interconnecting webs.

5. In combination in a hub for supporting adjustably a plurality of propeller blades, a hub box structure having oppositely disposed split collar portions thereon for engaging a driving shaft, and means for clamping said split collar portions on said driving shaft, a pair of spaced plates forming a plurality of radially disposed split collar members on the hub for supporting shanks of propeller blades at right angles to said driving shaft, and means of adjustably clamping said collars on the shanks of said propeller blades.

6. In combination in a hub for supporting adjustably a plurality of propeller blades, a hub box structure having oppositely disposed slotted collar portions thereon for engaging a driving shaft, and means for clamping said slotted collar portions on said driving shaft, a pair of spaced plates forming a plurality of radially disposed slotted collar members for supporting shanks of propeller blades at right angles to said driving shaft, and means of adjustably clamping said collars on the shanks of said propeller blades, said propeller blade shanks and slotted collars being threaded for engagement to one another.

7. In combination in a hub for supporting adjustably a plurality of propeller blades, a hub box structure having oppositely disposed slotted collar portions thereon for engaging a driving shaft, and means for clamping said slotted collar portions on said driving shaft, a plurality of radially disposed slotted collar members for supporting shanks of propeller blades at right angles to said driving shaft, and means of adjustably clamping said collars on the shanks of said propeller blades, said propeller blade shanks and slotted collars being threaded for engagement to one another, and spaced webs interconnecting in pairs the upper and lower halves of said slotted collars for receiving the propeller blade shanks, the inner edges of said webs being integrally formed on said box hub.

8. In a propeller hub for supporting adjustably propeller blades, means for mounting the hub on a driving shaft, slotted collars on the hub for radially and rotatably adjusting the in and out relationship of the propeller blades and the angular relationship of the propeller blades with respect to the hub, and reinforcing webs between respective halves of said collars adapted to reinforce the connection between said halves of said collars and the connection therewith with the hub.

FREDERICK CHARAVAY.